US012201083B2

(12) United States Patent
Ni et al.

(10) Patent No.: US 12,201,083 B2
(45) Date of Patent: Jan. 21, 2025

(54) GENERATING DEVICE FOR SIMULATING PARTICULATE ENVIRONMENT FOR EXPERIMENTAL ANIMAL

(71) Applicant: THE ACADEMY OF TIANJIN UNIVERSITY, HEFEI, Hefei (CN)

(72) Inventors: Guangjian Ni, Hefei (CN); Liqun Chen, Hefei (CN); Xinyu Gao, Hefei (CN); Yue Chen, Hefei (CN); Xiaoyu Guo, Hefei (CN)

(73) Assignee: THE ACADEMY OF TIANJIN UNIVERSITY, HEFEI, Hefei (CN)

( * ) Notice: Subject to any disclaimer, the term of this patent is extended or adjusted under 35 U.S.C. 154(b) by 212 days.

(21) Appl. No.: 17/994,413

(22) Filed: Nov. 28, 2022

(65) Prior Publication Data

US 2023/0097259 A1  Mar. 30, 2023

Related U.S. Application Data (63) Continuation of application No. PCT/CN2022/091390, filed on May 7, 2022.

(30) Foreign Application Priority Data

May 25, 2021 (CN) .......................... 202110568999.X (51) Int. Cl.
*A01K 1/03* (2006.01)
*A01K 1/01* (2006.01)
(Continued)

(52) U.S. Cl.
CPC .............. *A01K 1/031* (2013.01); *A01K 1/011* (2013.01); *A01K 1/0356* (2013.01); *A01K 29/005* (2013.01); *B01J 19/10* (2013.01)

(58) Field of Classification Search
CPC ............. A01K 1/031; A01K 1/00; A01K 1/03
(Continued)

(56) References Cited

U.S. PATENT DOCUMENTS 3,028,839 A * 4/1962 Crook ................. A01K 13/001
119/734
4,252,080 A * 2/1981 Gioia ................... A01K 67/033
119/6.5

(Continued)

FOREIGN PATENT DOCUMENTS

CN 102405847 A * 4/2012
CN 105662639 A * 6/2016
(Continued)

*Primary Examiner* — Magdalena Topolski
*Assistant Examiner* — Brook Victoria Schmid
(74) *Attorney, Agent, or Firm* — Bayramoglu Law Offices LLC (57) ABSTRACT

A generating device for simulating a particulate environment for an experimental animal includes an experimental chamber. An ultrasonic atomization device is installed at the bottom adjacent to the center of the experimental chamber. The upper side of the ultrasonic atomization device is connected to a guide device for guiding particles. The guide device includes an air seal cover, and a micro fan is installed inside the air seal cover to drive the movement of particles generated in the ultrasonic atomization device. Air guide pipes are fixedly connected to a side wall of the air seal cover. The generating device has good sealing performance, and can generate a variety of particle simulation environments to accurately and effectively simulate the biological effect of particles in the animal body. The generating device can improve the particle simulation environment, reduce the deviation of experimental data, and ensure the accuracy of the overall experimental data.

10 Claims, 10 Drawing Sheets

(51) Int. Cl.
A01K 1/035 (2006.01)
A01K 29/00 (2006.01)
B01J 19/10 (2006.01)

(58) Field of Classification Search
USPC .................................................. 119/417–420
See application file for complete search history.

(56) References Cited

U.S. PATENT DOCUMENTS

2004/0216737 A1* 11/2004 Anderson ................ A61D 7/04
                                                            128/203.12
2018/0228990 A1* 8/2018 Cole ................ A61M 16/0627

FOREIGN PATENT DOCUMENTS

| CN | 205337198 U | * | 6/2016 | |
|----|-------------|---|--------|---|
| CN | 105842185 A | * | 8/2016 | |
| CN | 106489850 A | * | 3/2017 | |
| CN | 107024951 A | * | 8/2017 | ............ G05D 27/02 |
| CN | 107278930 A | * | 10/2017 | |
| CN | 107836354 A | * | 3/2018 | |
| CN | 108240914 A |   | 7/2018 | |
| CN | 209187064 U |   | 8/2019 | |
| CN | 110558239 A | * | 12/2019 | |
| CN | 211793596 U |   | 10/2020 | |
| CN | 113508757 A |   | 10/2021 | |
| JP | 2008049220 A |  | 3/2008 | |
| JP | 2008301734 A |  | 12/2008 | |
| JP | 2009034585 A |  | 2/2009 | |
| KR | 102112720 B1 |  | 5/2020 | |

* cited by examiner

GENERATING DEVICE FOR SIMULATING PARTICULATE ENVIRONMENT FOR EXPERIMENTAL ANIMAL

CROSS REFERENCE TO THE RELATED APPLICATIONS

This application is the continuation application of International Application No. PCT/CN2022/091390, filed on May 7, 2022, which is based upon and claims priority to Chinese Patent Application No. 202110568999.X, filed on May 25, 2021, the entire contents of which are incorporated herein by reference.

TECHNICAL FIELD

The present invention relates to the technical field of animal environment simulation, in particular, to a generating device for simulating a particulate environment for an experimental animal.

BACKGROUND

When studying the physiological changes in animals in different exposure environments, the effects of particles on the tissues and organs of experimental animals are usually simulated by performing intravenous injection or nasal drip on the experimental animals in order to study the biological effects of organisms exposed to different simulated environments.

At present, the common research method is to study the biological effects of particles by performing intravenous injection or nasal drip on animals or placing the animals in a prepared experimental chamber to study and evaluate the changes in their physical and cognitive levels. The simulated environment in the current chamber cannot achieve the same effect as the real exposure environment, resulting in deviations in the experimental data and affecting the accuracy of the overall experimental data. In addition, the current particle experimental chamber is only able to simulate a single simulation environment, and the main function is to simulate a particulate matter (PM) environment. The current method is also unable to accommodate the simulation of a variety of particulate environments, such as nanoparticles, airborne virus particles, dust, and PM.

SUMMARY

An objective of the present invention is to provide a generating device of simulating a particulate environment for an experimental animal to solve the problems discussed in the background.

To achieve the above objective, a generating device of simulating the particulate environment for the experimental animal is provided, including an experimental chamber. An upper sealing device is arranged on the upper side of the experimental chamber. An excreta storage device configured to store animal excreta is arranged in the interior adjacent to the middle of the experimental chamber, and an ultrasonic atomization device is installed at the bottom adjacent to the center of the experimental chamber. The upper side of the ultrasonic atomization device is connected to a guide device for guiding particles.

The interior of the experimental chamber is provided with a bottom air supply chamber, a pulling chamber, and an experimental animal placement chamber in turn from bottom to top. Two sides of the experimental animal placement chamber are fixedly connected to an air pipe for inputting and outputting air, and a pulling port is arranged on a side of the pulling chamber.

The upper sealing device includes an upper cover with a rectangle chamber penetrating through the bottom. A connecting bar is fixedly connected to a bottom side wall of the upper cover, and a receiving bar is fixedly connected to an outer side wall adjacent to the top of the experimental chamber. The receiving bar and the connecting bar are attached to each other and connected by a screw.

The excreta storage device includes a rectangular simulation warehouse adapted to fit within the pulling port, and the interior of the simulation warehouse is provided with a storage chamber penetrating through the upper side.

The guide device includes an air seal cover, and a micro fan configured to drive the movement of particles generated in the ultrasonic atomization device is installed inside the air seal cover. Air guide pipes are symmetrical on the left and right and fixedly connected to a side wall of the air seal cover. The bottom of the air seal cover is connected to the interior adjacent to the bottom side of the bottom air supply chamber by a screw. One end of the ultrasonic atomization device is arranged inside the air seal cover. One end of the air guide pipes penetrates through the pulling chamber and extends into the interior of the experimental animal placement chamber.

As a further improvement of this technical solution, the upper side of the excreta storage device is provided with a baffle device, and the baffle device includes a baffle plate. Each of the baffle plate and the bottom of the experimental animal placement chamber is provided with a plurality of falling holes for emptying the animal excreta. The upper side of the baffle plate is in contact with a bottom side wall of the experimental animal placement chamber.

As a further improvement of this technical solution, an upper clamping port is arranged at the pulling chamber on the side of the experimental chamber away from the pulling port. One end of the baffle plate is inserted into the upper clamping port, and two sides of the baffle plate are provided with side clamping slots. Two sides of the interior of the pulling chamber are fixed with clamping bars corresponding to the side clamping slots, and the clamping bars are inserted into the side clamping slots.

As a further improvement of this technical solution, the bottom side walls of the pulling chamber are symmetrically fixed with pulling limit bars on the left and right for limiting the simulation warehouse. The bottom of the simulation warehouse is symmetrically provided with limit slots adapted to cooperate with the pulling limit bars on the left and right, and the pulling limit bars are inserted into the limit slots.

As a further improvement of this technical solution, an extension pipe is fixedly connected adjacent to the middle of two air guide pipes, and one end of the extension pipe is fixedly connected to an air emission ball. A plurality of air emission holes are arranged in the air guide pipes and the air emission ball.

As a further improvement of this technical solution, a side wall of the experimental animal placement chamber is provided with an installation port, and a TSI™ detector (particle detector) penetrating through the installation port is installed on a side of the experimental animal placement chamber. Each of the left and right sides of the interior of the experimental animal placement chamber is fixed with a measurement device fixing frame, and a thermometer and a hygrometer are fixedly installed on an inner side wall of the measurement device fixing frame.

As a further improvement of this technical solution, an inner side wall of the experimental animal placement chamber is symmetrically fixed with two diet fixing plates on the left and right. The experimental animal placement chamber is provided with a feeding port on the side where the diet fixing plates are located, and a sealing baffle made of soft rubber is installed inside the feeding port. A food bucket configured to hold food and water for the animal is slidably connected between the diet fixing plates.

As a further improvement of this technical solution, the upper side of the upper cover is provided with an entrance, and the entrance is hinged with an upper sealing plate configured to seal the entrance. Each of the left and right sides of the interior of the upper cover is provided with an ultraviolet lamp for sterilization and a lighting tube for illumination.

As a further improvement of this technical solution, one end of the air pipe is provided with a pipe filter device. The pipe filter device includes a connection pipe threaded with the air pipe. A filter plug for filtering the particles in the air is arranged inside the connection pipe.

As a further improvement of this technical solution, one end of the filter plug is inserted into the air pipe, and a filter cotton for blocking the particles is arranged inside the filter plug.

Compared with the prior art, the present invention has the following advantages.

1. In the generating device of simulating the particulate environment for the experimental animal, the atomized particles generated by the ultrasonic atomization device are transmitted to the interior of the experimental animal placement chamber through the guide device so that the interior of the experimental animal placement chamber is filled with the simulated particles. The animal placed in the experimental animal placement chamber absorbs the atomized particles, ensuring that the animal is not disturbed in the simulated environment, which ensures the stability of the experimental environment and improves the accuracy of experimental data detection.

2. In the generating device of simulating the particulate environment for the experimental animal, the excreta storage device is arranged to collect the animal excreta. Moreover, a baffle device is arranged on the excreta storage device to seal the bottom of the experimental animal placement chamber. When the excreta storage device needs to be emptied of the animal excreta, the bottom of the experimental animal placement chamber is blocked and sealed by adjusting the position of the baffle device to facilitate the removal of the excreta storage device from the pulling chamber and reduce the damage to the internal air tightness of the device caused by pulling the excreta storage device.

3. In the generating device of simulating the particulate environment for the experimental animal, a pipe filter device is arranged on the air pipe to filter the air flowing in and out of the experimental animal placement chamber, which prevents the external air from entering the experimental animal placement chamber through the air pipe to affect the environment inside the experimental animal placement chamber, thereby ensuring the accuracy of the experimental data.

4. In the generating device of simulating the particulate environment for the experimental animal, the ultrasonic atomization device can meet the simulation requirements of a variety of particulate environments in addition to the PM environment and realize the multi-environment simulation that integrates the environment of nanoparticles, airborne virus particles, dust and PM, thereby enriching the types of environment simulation.

Each label in the figures means:
1, experimental chamber; 11, bottom air supply chamber; 12, pulling chamber; 121, upper clamping port; 122, pulling port; 123, pulling limit bar; 13, experimental animal placement chamber; 14, air pipe; 15, installation port; 16, measurement device fixing frame; 17, diet fixing plate; 171, feeding port; 18, receiving bar;
2, upper sealing device; 21, upper sealing plate; 22, upper cover; 23, entrance; 24, connecting bar;
3, excreta storage device; 31, simulation warehouse; 32, storage chamber;
4, ultrasonic atomization device;
5, guide device; 51, air seal cover; 52, air guide pipe; 53, extension pipe; 54, air emission ball; 55, air emission hole;
6, baffle device; 61, baffle plate; 62, falling hole; 63, side clamping slot;
7, TSI™ detector (particle detector);
8, pipe filter device; 81, connection pipe; 82, filter plug; and
9, food bucket.

DETAILED DESCRIPTION OF THE EMBODIMENTS

The technical solution in the embodiments of the present invention will be described below clearly and completely in combination with the drawings of the embodiments of the present invention. It is obvious that the described embodiments are only part of the embodiments of the present invention, not all embodiments. Based on the embodiments of the present invention, all other embodiments obtained by those having ordinary skill in the art without creative work shall fall within the scope of the protection of the present invention.

In the description of the present invention, it is necessary to understand that the direction or position relationship indicated by the terms "center", "longitudinal", "transverse", "length", "width", "thickness", "up", "down", "front", "back", "left", "right", "vertical", "horizontal", "top", "bottom", "inside", "outside", "clockwise" and "counterclockwise" are based on the direction or position relationship shown in the drawings. It is only for the purpose of describing the present invention and simplifying the description, rather than indicating or implying that the equipment or element referred to must have a specific direction or be constructed and operated in a specific direction and cannot be understood as a limitation to the present invention.

In addition, the terms "first" and "second" are used only for descriptive purposes and cannot be understood to indicate or imply relative importance or implicitly indicate the number of technical features indicated. Thus, features defined as "first" and "second" may include one or more of these features either explicitly or implicitly. In the description of the present invention, "multiple" means two or more unless otherwise defined clearly and specifically.

Embodiment 1

Referring to FIGS. 1-10, a generating device of simulating a particulate environment for an experimental animal includes an experimental chamber 1, and an upper sealing device 2 is arranged on the upper side of the experimental chamber 1. An excreta storage device 3 configured to store animal excreta is arranged in the interior adjacent to the middle of experimental chamber 1, and an ultrasonic atomization device 4 is installed at the bottom adjacent to the center of experimental chamber 1. The upper side of the ultrasonic atomization device 4 is connected to a guide device 5 for guiding particles.

The interior of the experimental chamber 1 is provided with a bottom air supply chamber 11, a pulling chamber 12, and an experimental animal placement chamber 13 in turn from bottom to top. Two sides of the experimental animal placement chamber 13 are fixedly connected to an air pipe 14 for inputting and outputting air, and a pulling port 122 is arranged on a side of the pulling chamber 12.

The upper sealing device 2 includes an upper cover 22 with a rectangle chamber penetrating through the bottom. A connecting bar 24 is fixedly connected on a bottom side wall of the upper cover 22, and a receiving bar 18 is fixedly connected on an outer side wall adjacent to the top of the experimental chamber 1. The receiving bar 18 and the connecting bar 24 are attached to each other and connected by a screw.

The excreta storage device 3 includes a rectangular simulation warehouse 31 adapted to fit within the pulling port 122, and the interior of the simulation warehouse 31 is provided with a storage chamber 32 penetrating through the upper side.

When the experimental chamber 1, the upper sealing device 2, and the excreta storage device 3 in the present embodiment are in use, an upper sealing plate 21 is flipped to be opened from an entrance 23, and the experimental animal is put into the interior of the experimental animal placement chamber 13 through the entrance 23 so that the experimental animal can live in the designated simulation space. After the experimental animal is placed, the upper sealing plate 21 is flipped to cover entrance 23 so that the upper sealing device 2 and the experimental chamber 1 are sealed to ensure the separation of the experimental environment of the experimental animal from the external environment, thereby improving the accuracy of the experimental data. After the experimental animal excretes, the excreta of the animal falls into the excreta storage device 3 and is collected by the excreta storage device 3, so that the excreta can be emptied out by moving the excreta storage device 3 when animal excreta fills the excreta storage device 3, which ensures the normal operation of the experiment of simulating the particulate environment.

Figure 8:
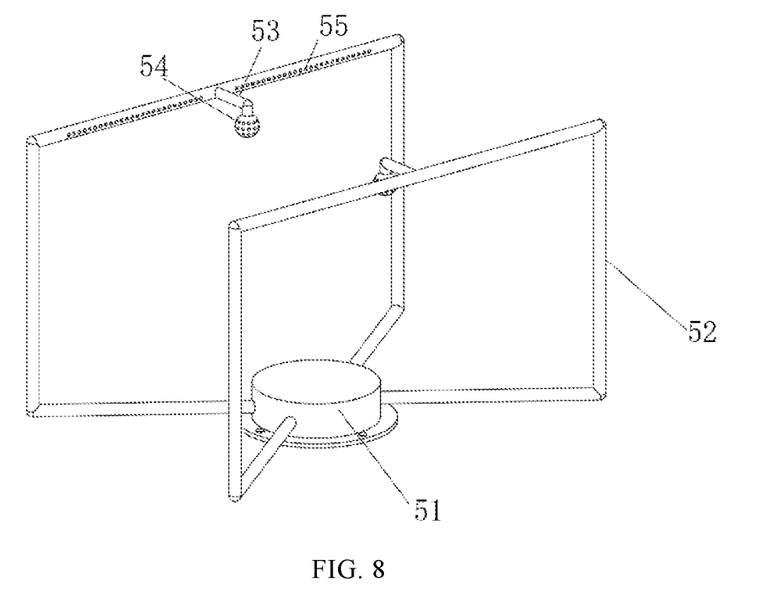
FIG. 8 shows a schematic view of the structure of a guide device of Embodiment 1.

The guide device 5 includes an air seal cover 51, and a micro fan configured to drive the movement of particles generated in the ultrasonic atomization device 4 is installed inside the air seal cover 51. Air guide pipes 52 are symmetrical on the left and right and fixedly connected to a side wall of the air seal cover 51. The bottom of the air seal cover 51 is connected to the interior adjacent to the bottom side of the bottom air supply chamber 11 by a screw. One end of the ultrasonic atomization device 4 is arranged inside the air seal cover 51. One end of the air guide pipes 52 penetrates through the pulling chamber 12 and extends into the interior of the experimental animal placement chamber 13.

When the guide device 5 in the present embodiment is in use, the ultrasonic atomization device 4 is turned on, and the cavitation effect generated in a liquid medium by ultrasonic waves in the ultrasonic atomization device 4 leads to the generation of microwaves, such that the solution particles placed in the ultrasonic atomization device 4 for the experiment are atomized. The atomized solution particles are driven into the air guide pipes 52 by the micro fan in the air seal cover 51 and follow the pipe of the air guide pipes 52 to flow into the experimental animal placement chamber 13 to change the environment of the experimental animal placement chamber 13, thereby changing the content of particles in the experimental animal placement chamber 13. When moving in the experimental animal placement chamber 13, the experimental animal absorbs air having the particles from the experimental animal placement chamber 13. In this way, the trouble of intravenous injection and nasal drip is avoided, the impact of the experiment due to environmental differences is reduced effectively, and the accuracy of body change data of the experimental animal is enhanced in the simulated environment so that the experimental animal has more research significance and value.

Figure 9:
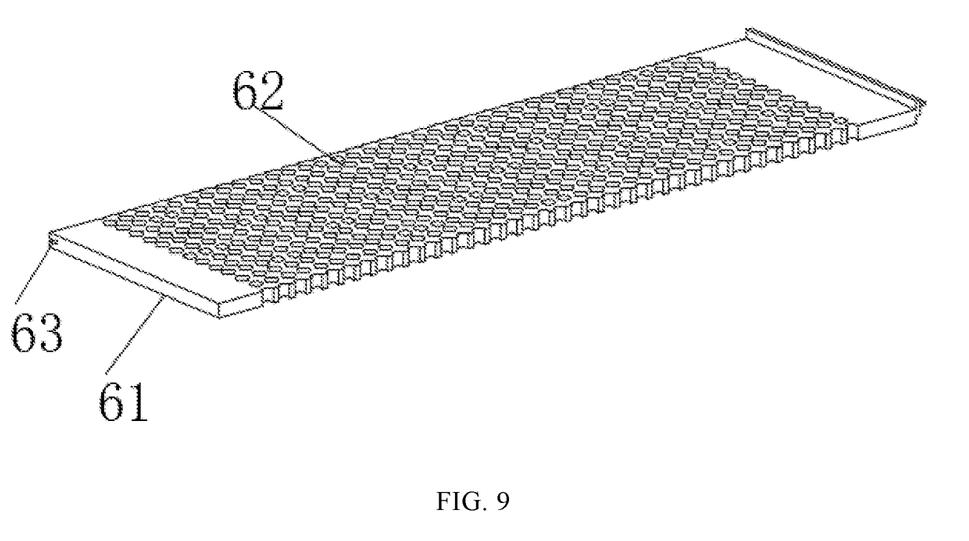
FIG. 9 shows a perspective view of the structure of a baffle device of Embodiment 1.

Further, the upper side of the excreta storage device 3 is provided with a baffle device 6, and the baffle device 6 includes a baffle plate 61. Each of the baffle plate 61 and the bottom of the experimental animal placement chamber 13 is provided with a plurality of falling holes 62 for emptying the animal excreta. The upper side of the baffle plate 61 is in contact with a bottom side wall of the experimental animal placement chamber 13. An upper clamping port 121 is arranged at the pulling chamber 12 on the side of the experimental chamber 1 away from the pulling port 122. One end of the baffle plate 61 is inserted into the upper clamping port 121, and two sides of the baffle plate 61 are provided with side clamping slots 63. Two sides of the interior of the pulling chamber 12 are fixed with clamping bars corresponding to the side clamping slots 63, and the clamping bars are inserted into the side clamping slots 63. The bottom side walls of the pulling chamber 12 are symmetrically fixed with pulling limit bars 123 on the left and right for limiting the simulation warehouse 31. The bottom of the simulation warehouse 31 is symmetrically provided with limit slots adapted to cooperate with the pulling limit bars 123 on the left and right, and the pulling limit bars 123 are inserted into the limit slots. When the excreta storage device 3 needs to be emptied of the animal excreta, the baffle plate 61 is pulled to be interlaced with the falling holes 62 at the bottom of the experimental animal placement chamber 13, so that the baffle plate 61 seals the bottom of the experimental animal placement chamber 13. In this way, the air in the experimental animal placement chamber 13 is prevented from entering the pulling chamber 12 through the falling holes 62, and the external air is also prevented from entering the experimental animal placement chamber 13 through the pulling port 122, thereby reducing the damage to the internal air tightness of the device.

Specifically, an extension pipe 53 is fixedly connected adjacent to the middle of two air guide pipes 52, and one end of the extension pipe 53 is fixedly connected to an air emission ball 54. A plurality of air emission holes 55 are arranged in the air guide pipes 52 and the air emission ball 54. Through the air emission holes 55 on the air emission ball 54 and the air guide pipes 52, the air is emitted into the experimental animal placement chamber 13, so that the experimental environment in the experimental animal placement chamber 13 meets the requirements to facilitate the running of the experiment.

In addition, a side wall of the experimental animal placement chamber 13 is provided with an installation port 15, and a TSI™ detector (particle detector) 7 penetrating through the installation port 15 is installed on a side of the experimental animal placement chamber 13. Each of the left and right sides of the interior of the experimental animal placement chamber 13 is fixed with a measurement device fixing frame 16, and a thermometer and a hygrometer are fixedly installed on an inner side wall of the measurement device fixing frame 16. An inner side wall of the experimental animal placement chamber 13 is symmetrically fixed with two diet fixing plates 17 on the left and right. The experimental animal placement chamber 13 is provided with a feeding port 171 on the side where the diet fixing plates 17 are located, and a sealing baffle made of soft rubber is installed inside the feeding port 171. A food bucket 9 configured to hold food and water for the animal is slidably connected between the diet fixing plates 17. The food bucket 9 is arranged in the experimental animal placement chamber 13 to feed the experimental animal, thereby ensuring the normal life of the experimental animal. Moreover, the sealing rubber baffle is arranged on the feeding port 171, so that after the food and water are placed into the food bucket 9, it is convenient to seal the feeding port 171, while it is convenient to control the diet conditions of the rat and reduce the damage to the internal air tightness of the device. In addition, the thermometer, the hygrometer, and the TSI™ detector (particle detector) 7 are arranged to ensure the stability of the simulated environment.

Figure 1:
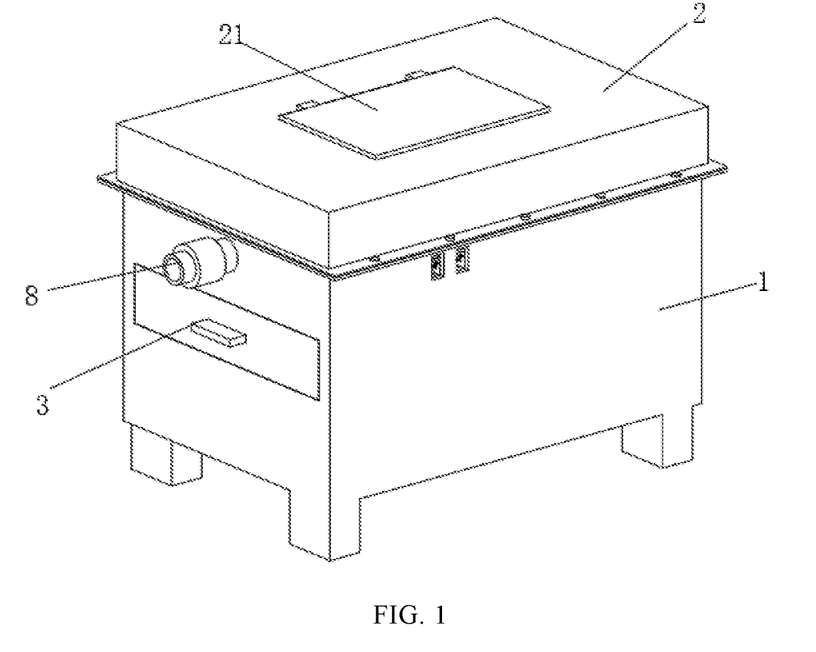
FIG. 1 shows a schematic view of an overall structure of Embodiment 1.
Figure 2:
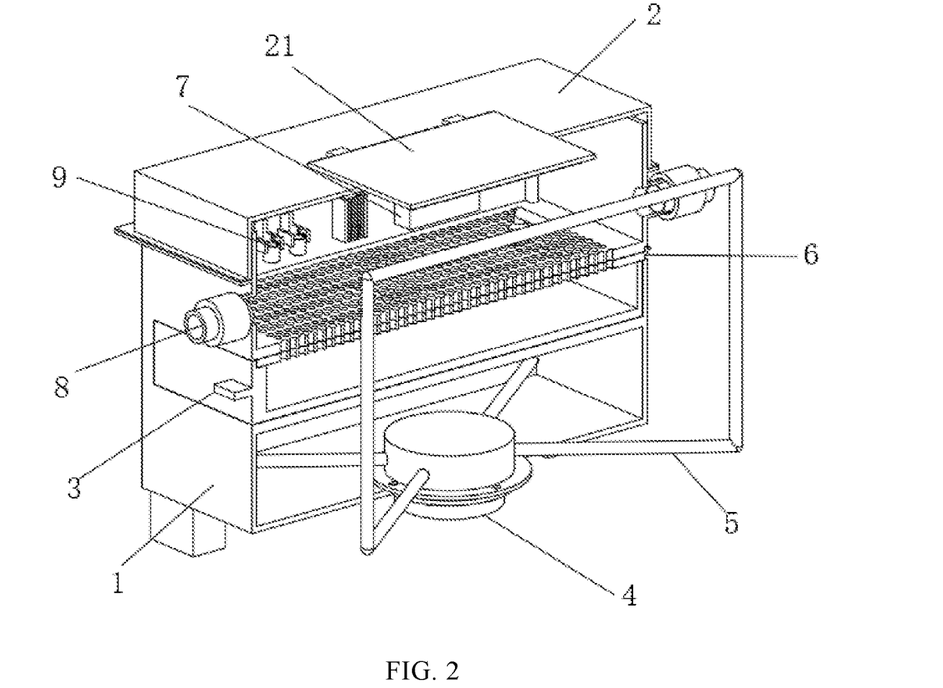
FIG. 2 shows a perspective view of the overall structure of Embodiment 1.
Figure 3:
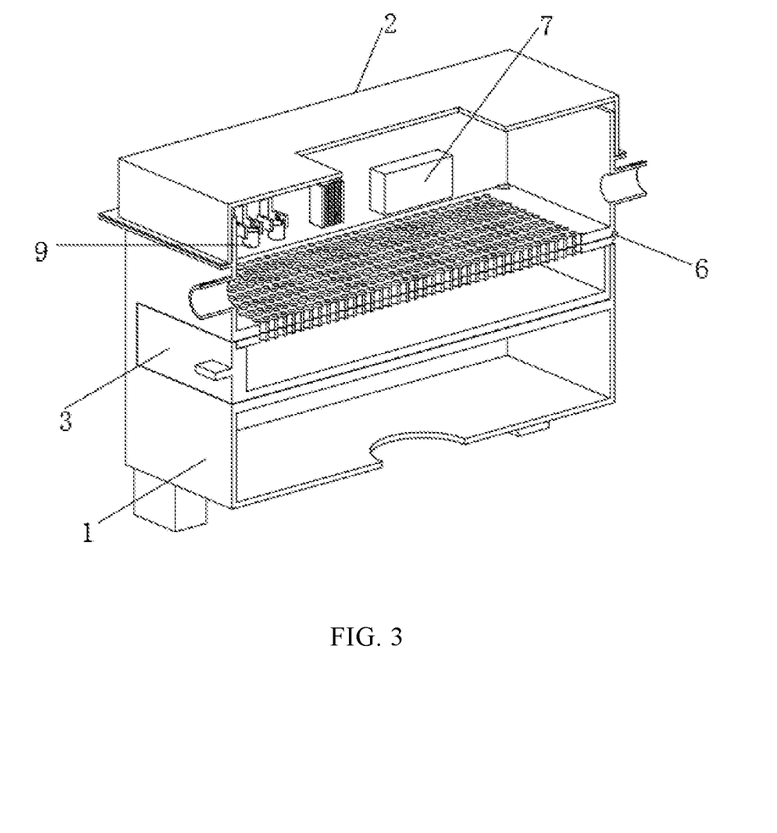
FIG. 3 shows a perspective view of a part of the overall structure of Embodiment 1.
Figure 4:
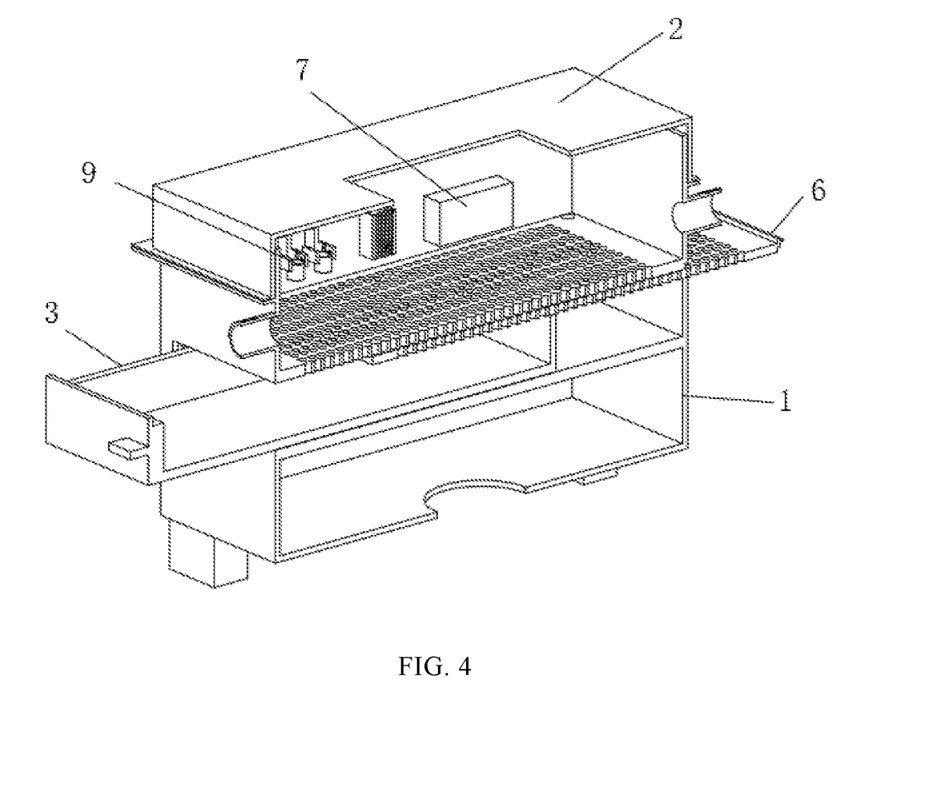
FIG. 4 shows a perspective view of a part of the overall exploded structure of Embodiment 1.
Figure 5:
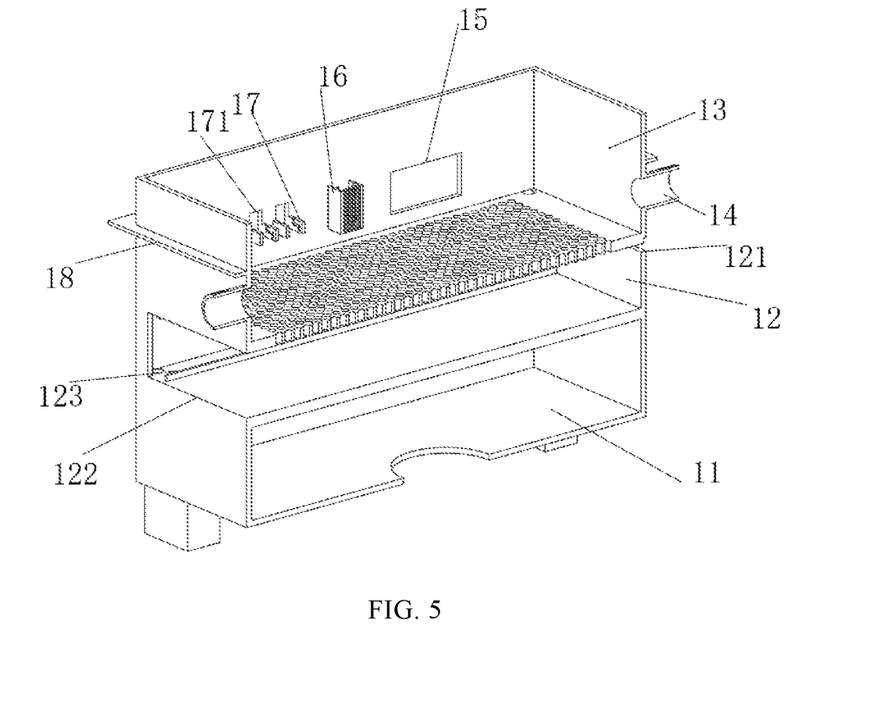
FIG. 5 shows a perspective view of the structure of an experimental chamber of Embodiment 1.
Figure 6:
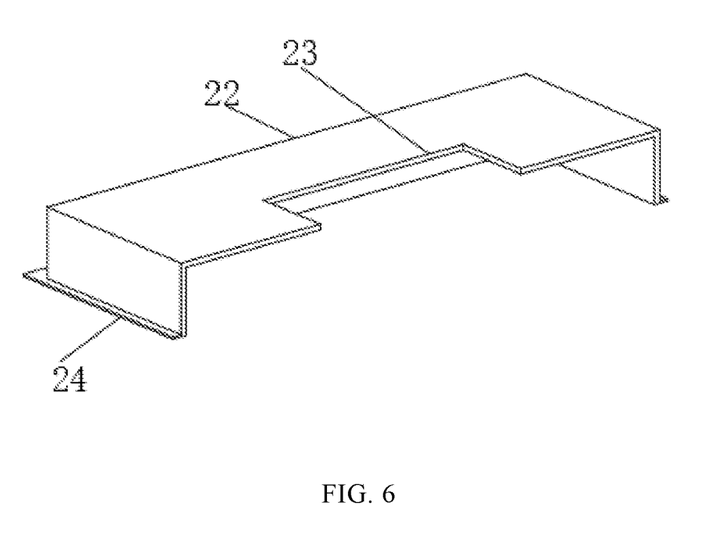
FIG. 6 shows a perspective view of the structure of an upper sealing device of Embodiment 1.
Figure 7:
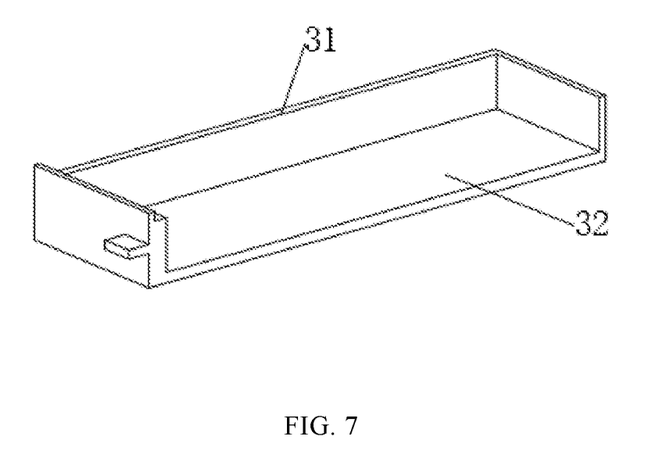
FIG. 7 shows a perspective view of the structure of an excreta storage device of Embodiment 1.

Further, the upper side of the upper cover 22 is provided with the entrance 23, and the entrance 23 is hinged with the upper sealing plate 21 configured to seal the entrance 23. Each of the left and right sides of the interior of the upper cover 22 is provided with an ultraviolet lamp for sterilization and a lighting tube for illumination. The ultraviolet lamp is arranged in the upper cover 22 for sterilization before and after the experiment, and the lighting tube is installed to simulate the effects of a different light on the organism when being in the dark.

Figure 10:
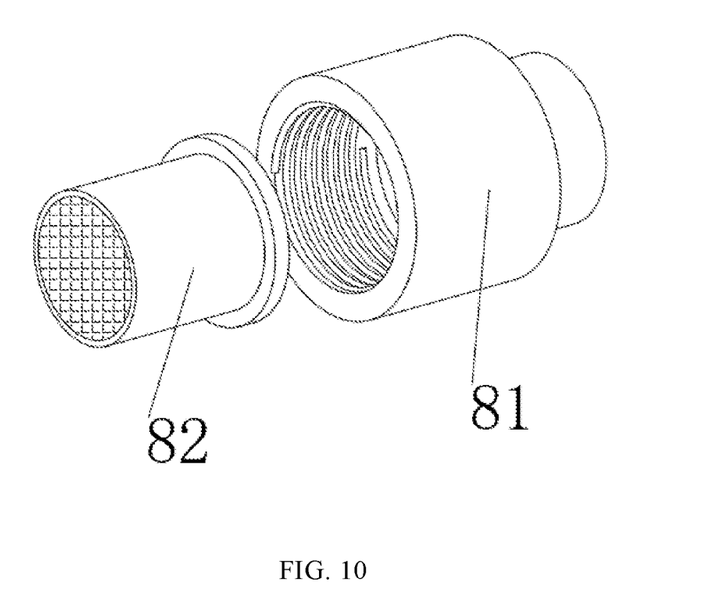
FIG. 10 shows a schematic view of the exploded structure of a pipe filter device of Embodiment 1.

Specifically, one end of the air pipe 14 is provided with a pipe filter device 8. The pipe filter device 8 includes a connection pipe 81 threaded with the air pipe 14. A filter plug 82 for filtering the particles in the air is arranged inside the connection pipe 81. One end of the filter plug 82 is inserted into the air pipe 14, and a filter cotton for blocking the particles is arranged inside the filter plug 82. The filter plug 82 is arranged to filter the air passing through the air pipe 14 to ensure the purity of the air flowing in and out of the experimental animal placement chamber 13 and the accuracy of the experimental data.

The basic principles, main features, and advantages of the present invention are shown and described above. Those skilled in the art should understand that the present invention is not limited by the above embodiments. The embodiments and descriptions described above are only preferred examples of the present invention and are not used to limit the present invention. Without departing from the spirit and scope of the present invention, there will be various changes and improvements to the present invention, and these changes and improvements all shall fall within the scope of protection of the present invention. The scope of protection of the present invention is defined by the attached claim and its equivalent.

What is claimed is:

1. A generating device for simulating a particulate environment for an experimental animal comprising an experimental chamber, wherein an upper sealing device is arranged on an upper side of the experimental chamber; an excreta storage device configured to store animal excreta is arranged in an interior adjacent to a middle of the experimental chamber, and an ultrasonic atomization device is installed at a bottom adjacent to a center of the experimental chamber; an upper side of the ultrasonic atomization device is connected to a guide device for guiding particles;

the interior of the experimental chamber is provided with a bottom air supply chamber, a pulling chamber, and an experimental animal placement chamber in turn from bottom to top, wherein the experimental animal placement chamber has two sides which are fixedly connected to respective air pipes for inputting and outputting air, and a pulling port is arranged on a side of the pulling chamber;

the upper sealing device comprises an upper cover with a rectangular chamber, wherein the rectangular chamber penetrates through a bottom of the upper sealing device; a connecting bar is fixedly connected to a bottom side wall of the upper cover, and a receiving bar is fixedly connected to an outer side wall adjacent to a top of the experimental chamber; the receiving bar and the connecting bar are attached to each other and connected by a first screw;

the excreta storage device comprises a drawer adapted to fit within the pulling port, and an interior of the drawer is provided with a storage chamber, wherein the storage chamber penetrates through an upper side of the drawer; and the guide device comprises an air seal cover, wherein a micro fan configured to drive a movement of one or more particles generated in the ultrasonic atomization device is installed inside the air seal cover; air guide pipes are fixedly connected to a side wall of the air seal cover; a bottom of the air seal cover is connected to an interior adjacent to a bottom side of the bottom air supply chamber by a second screw; one end of the ultrasonic atomization device is arranged inside the air seal cover; and one end of each of the air guide pipes penetrates through the pulling chamber and extends into an interior of the experimental animal placement chamber.

2. The generating device for simulating the particulate environment for the experimental animal according to claim 1, wherein an upper side of the excreta storage device is provided with a baffle device, and the baffle device comprises a baffle plate; each of the baffle plate and a bottom of the experimental animal placement chamber is provided with a plurality of falling holes for emptying the animal excreta; an upper side of the baffle plate is in contact with a bottom side wall of the experimental animal placement chamber.

3. The generating device for simulating the particulate environment for the experimental animal according to claim 2, wherein an upper clamping port is arranged at the pulling chamber on a side of the experimental chamber, wherein the side of the experimental chamber is away from the pulling port; one end of the baffle plate is insertable into the upper clamping port, and two sides of the baffle plate are provided with side clamping slots; two sides of an interior of the pulling chamber are fixed with clamping bars corresponding to the side clamping slots, and the clamping bars are insertable into the side clamping slots.

4. The generating device for simulating the particulate environment for the experimental animal according to claim 1, wherein bottom side walls of the pulling chamber are symmetrically fixed with pulling limit bars on left and right for limiting the drawer; a bottom of the drawer is symmetrically provided with limit slots adapted to cooperate with the pulling limit bars on the left and right, and the pulling limit bars are insertable into the limit slots.

5. The generating device for simulating the particulate environment for the experimental animal according to claim 1, wherein an extension pipe is fixedly connected adjacent to a middle of two air guide pipes, and one end of the extension pipe is fixedly connected to an air emission ball; and a plurality of air emission holes for passing air are arranged in the two air guide pipes and the air emission ball.

6. The generating device for simulating the particulate environment for the experimental animal according to claim 1, wherein a side wall of the experimental animal placement chamber is provided with an installation port, and a detector penetrating through the installation port is installed on a side of the experimental animal placement chamber; each of left and right sides of the interior of the experimental animal placement chamber is fixed with a measurement device fixing frame, and a thermometer and a hygrometer are fixedly installed on an inner side wall of each of the measurement device fixing frames.

7. The generating device for simulating the particulate environment for the experimental animal according to claim 1, wherein an inner side wall of the experimental animal placement chamber is fixed with two diet fixing plates; the experimental animal placement chamber is provided with a feeding port on the side where the two diet fixing plates are located, and a sealing baffle made of soft rubber is installed inside the feeding port; and a food bucket configured to hold food and water for the experimental animal is slidably connected between the two diet fixing plates.

8. The generating device for simulating the particulate environment for the experimental animal according to claim 1, wherein an upper side of the upper cover is provided with an entrance, and the entrance is hinged with an upper sealing plate configured to seal the entrance; and each of left and right sides of an interior of the upper cover is provided with an ultraviolet lamp for sterilization and a lighting tube for illumination.

9. The generating device for simulating the particulate environment for the experimental animal according to claim 1, wherein one end of each air pipe is provided with a pipe filter device; the pipe filter device comprises a connection pipe threaded with the air pipes; and a filter plug for filtering particles in the air is arranged inside the connection pipe.

10. The generating device for simulating the particulate environment for the experimental animal according to claim 9, wherein one end of the filter plug is insertable into the air pipe, and filter cotton for blocking particles is arranged inside the filter plug.

* * * * *